United States Patent
Foerster et al.

(10) Patent No.: US 8,849,675 B1
(45) Date of Patent: Sep. 30, 2014

(54) SUGGESTED QUERY CONSTRUCTOR FOR VOICE ACTIONS

(71) Applicant: Google Inc., Mountain View, CA (US)

(72) Inventors: Jakob Foerster, Zurich (CH); Simon Tokumine, London (GB); Matthias Quasthoff, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/132,676

(22) Filed: Dec. 18, 2013

(51) Int. Cl.
- *G10L 15/00* (2013.01)
- *G10L 21/00* (2013.01)
- *G10L 15/08* (2006.01)

(52) U.S. Cl.
CPC .................................. *G10L 15/08* (2013.01)
USPC ........................................ 704/275; 704/251

(58) Field of Classification Search
CPC ..... G10L 15/22; G10L 15/1822; G10L 15/19; G10L 15/222; G10L 2015/22; G10L 2015/221; G10L 2015/223; G10L 2015/225
USPC .................. 704/251, 257, 270, 275
See application file for complete search history.

(56) References Cited

U.S. PATENT DOCUMENTS

| | | | |
|---|---|---|---|
| 5,890,122 A | 3/1999 | Van Kleeck et al. | |
| 6,456,978 B1 * | 9/2002 | Wymore et al. | 704/275 |
| 8,219,407 B1 * | 7/2012 | Roy et al. | 704/275 |
| 8,275,617 B1 | 9/2012 | Morgan et al. | |
| 2013/0179173 A1 | 7/2013 | Lee et al. | |

\* cited by examiner

*Primary Examiner* — Angela A Armstrong
(74) *Attorney, Agent, or Firm* — Fish & Richardson P.C.

(57) ABSTRACT

Methods, systems, and apparatus, including computer programs encoded on a computer storage medium, for suggesting a phrase for performing a voice action. The methods, systems, and apparatus include actions of classifying a received phrase as an incomplete phrase for performing a voice action based at least on determining that (i) the voice action requires a parameter, and (ii) that no term of the phrase corresponds to the parameter. Additional actions include, in response to classifying the phrase as an incomplete phrase, generating a prompt for entry of the parameter, and in response to the prompt, receiving data indicating an entered parameter. Further actions include providing, for output, a suggested complete phrase for performing the voice action using the entered parameter.

19 Claims, 5 Drawing Sheets

SUGGESTED QUERY CONSTRUCTOR FOR VOICE ACTIONS

TECHNICAL FIELD

This disclosure generally relates to voice commands.

BACKGROUND

A computer may perform an action in response to a voice command. For example, a user may say "SET AN ALARM AT 7 AM TOMORROW," and a computer may set an alarm for the morning of the following day.

SUMMARY

In general, an aspect of the subject matter described in this specification may involve a process for generating and suggesting a phrase for performing a likely intended voice action. As used by this specification, a 'voice action' refers to an action that is automatically performed by a system in response to a voice command, or a predetermined phrase or sequence of terms that follow a predetermined grammar, from a user.

The system may provide a voice interface through which a user may instruct the system to perform voice actions. However, it may be difficult for users to learn how to effectively invoke voice actions, e.g., what specific words trigger the system to perform a particular voice actions using the correct parameters. For example, particular voice actions may require that the user provide certain, specific parameters, referred to as 'required parameters,' before the system has sufficient information to perform the voice action. As one example, the voice action for setting an alarm may require a time parameter and a date parameter before the voice action of setting an alarm can be performed. However, the user may not know which parameters are required, and may thus speak an 'incomplete voice command,' or 'incomplete phrase' that does not include all of the required information. Under these circumstances, the system may then prompt the user, either audibly or visually, to supply the omitted parameters.

The process of prompting a user to supply omitted parameters that may be required to perform a voice action can take a long time, can feel unnatural to and can inconvenience the user. Accordingly, based on the information that a user provides in response to prompting,' the voice responsive system may suggest a 'complete voice command,' or a 'complete phrase,' that includes all the terms that a user should say to perform the voice action in the future. As an example of the system, in response to the user saying "SET AN ALARM," entering a time parameter and a date parameter through a graphical user interface, the voice responsive system may say, "NEXT TIME, SAY 'SET AN ALARM AT 7 AM TOMORROW.'"

In some aspects, the subject matter described in this specification may be embodied in methods that may include the actions of classifying a received phrase as an incomplete phrase for performing a voice action based at least on determining that (i) the voice action requires a parameter, and (ii) that no term of the phrase corresponds to the parameter. Additional actions may include in response to classifying the phrase as an incomplete phrase, generating a prompt for entry of the parameter and in response to the prompt, receiving data indicating an entered parameter. A further action may include providing, for output, a suggested complete phrase for performing the voice action using the entered parameter.

Other versions include corresponding systems, apparatus, and computer programs, configured to perform the actions of the methods, encoded on computer storage devices.

These and other versions may each optionally include one or more of the following features. For instance, in some implementations, actions may further include receiving the phrase, wherein the phrase includes one or more terms that correspond to the voice action.

In certain aspects, generating a prompt for entry of the parameter may include at least one of generating a user interface for display that includes fields for entry of the parameter and synthesizing speech that requests the user speak the parameter.

In some aspects, actions may further include receiving data indicating another parameter that is required for the voice action and determining that data indicating all parameters that are required for the voice action have been received. Providing, for output, the suggested complete phrase for performing the voice action may include synthesizing speech of the suggested complete phrase in response to determining that data indicating all the parameters that are required for the voice action have been received.

In some implementations, actions may further include before receiving data indicating the entered parameter, receiving data indicating another parameter that is required for the voice action. An additional action may include before providing, for output, the suggested complete phrase for performing the voice action using the entered parameter, providing, for display in a user interface, a suggested partially complete phrase for performing the voice action using the other parameter.

In certain aspects, actions may further include receiving data indicating another parameter that is not required for the voice action. Providing, for output, the suggested complete phrase for performing the voice action using the entered parameter may include providing, for output, a suggested complete phrase for performing the voice action using the received parameter and the received other parameter.

In some aspects, providing, for output, a suggested complete phrase for performing the voice action using the entered parameter may include selecting a text pattern based at least on the one or more terms that correspond to the voice action and generating the suggested complete phrase based at least on applying the selected text pattern to the entered parameter.

In some implementations, the suggested complete phrase may be a phrase that causes the voice action to be performed without prompting for the entry of the parameter after determining that the suggested complete phrase includes one or more terms that correspond to the voice action.

In certain aspects, the suggested complete phrase may not include any term that appears in the received phrase.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
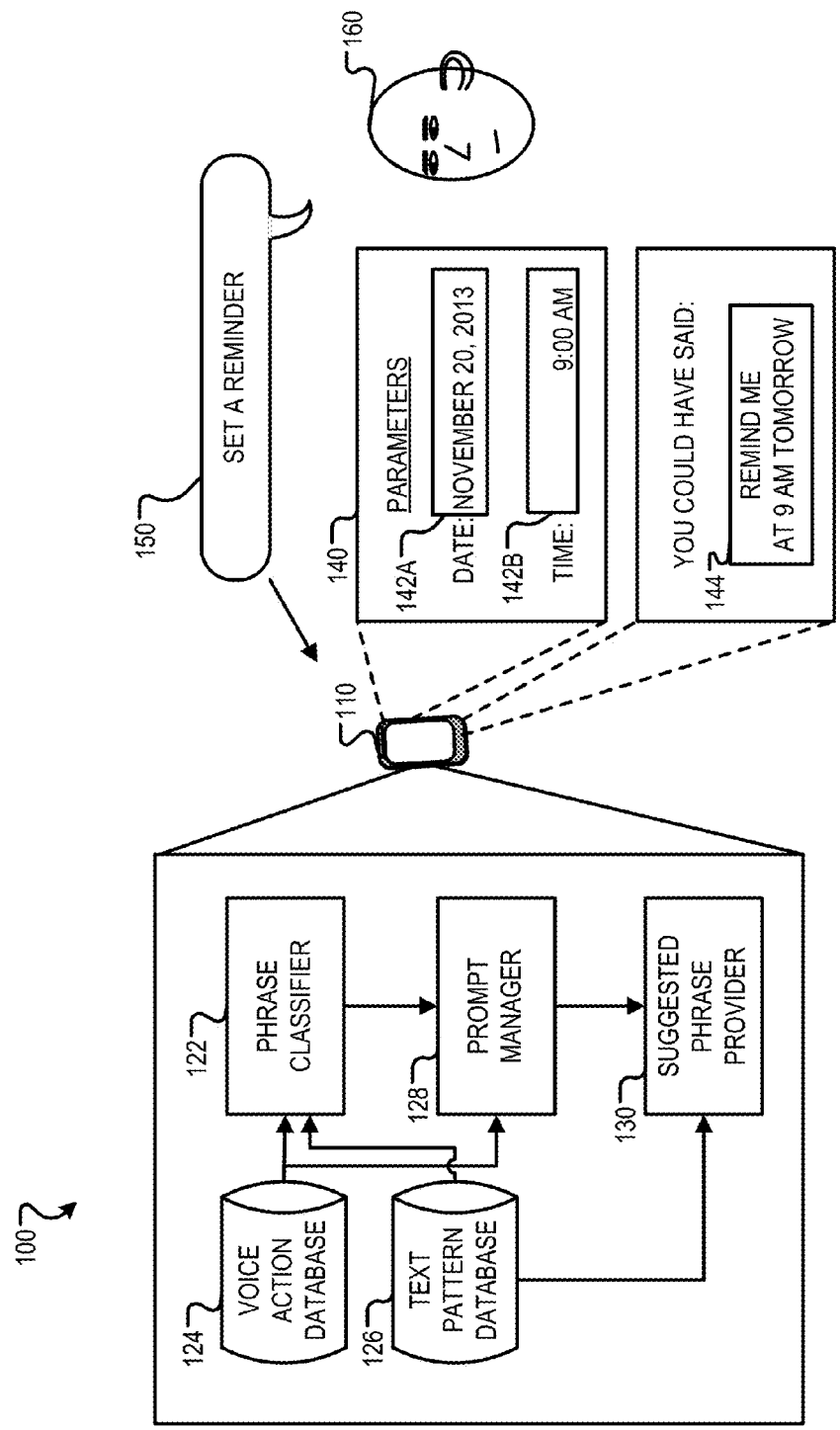
FIG. 1 is a block diagram of an example system for suggesting a phrase for performing a voice action.

FIG. 1 is a block diagram of an example system 100 for suggesting a phrase for performing a voice action. Generally, the system 100 may include a device 110, e.g., a mobile phone, that may respond to phrases, spoken by a user 160, for performing voice actions.

The device 110 may include a phrase classifier 122 that classifies phrases spoken by the user, a voice action database 124 that stores voice commands, a text pattern database 126 that stores text patterns that are associated with different voice actions, a prompt manager 128 that requests parameters from the user 160, and a suggested phrase provider 130 that provides a suggested phrase 144 to the user 160. The phrase classifier 122 may classify whether a phrase 170 that is said by the user 160 is an incomplete phrase for performing a voice action or a complete phrase for performing the voice action.

For example, the user 160 may speak a phrase, e.g., "SET A REMINDER," and the phrase classifier 122 may classify the phrase as an incomplete phrase. As a result, the device 110 may display a user interface 140 with fields 142A and 142B for the user to enter a parameter for a date to set for the reminder, and a parameter for a time to set for the reminder. The user 160 may enter the date "Nov. 20, 2013" and the time "9:00 AM" using the interface. In response, the device 110 may then display a suggested complete phrase 144, "SET A REMINDER AT 9 AM TOMORROW."

The phrase classifier 122 may be trained classify a phrase based on information known about voice actions stored in the voice action database 124. The voice actions in the voice action database 124 may indicate required parameters for the voice action, and parameters that may be optional, referred to as 'optional parameters,' for the voice action. For example, a voice action for setting a reminder may indicate that the voice action for setting a reminder has required parameters of a date parameter and a time parameter, and an optional parameter of a priority level that may describe a priority level of the reminder.

The phrase classifier 122 may further classify the phrase based on text patterns stored in the text pattern database 126. The text patterns may be associated with voice actions and may identify trigger terms, that may indicate the voice action associated with the text pattern is to be performed, and parameters. The text pattern may also indicate the relative location of the trigger terms and the parameters. In using the text patterns to make a classification, the phrase classifier 122 may determine the text pattern that best matches the terms in the received phrase and then use the text pattern that best matches the received phrase to tokenize the terms of the received phrase to identify trigger terms in the received phrase and terms in the received phrase that may be parameters for the particular voice action.

For example, the text pattern database 126 may include, among other text patterns, three text patterns that are all associated with a voice action for setting a reminder: "REMIND ME AT [TIME] ON [DATE]," "SET A REMINDER AT [TIME] ON [DATE]," and "SET A [PRIORITY LEVEL] PRIORITY REMINDER AT [TIME] ON [DATE]," where "REMIND ME," "SET A REMINDER," and "SET A" followed by "PRIORITY REMINDER" may be trigger terms indicating a phrase is for performing the voice action for setting a reminder, "[TIME]" may indicate a parameter for a time, "[DATE]" may indicate parameter for a date, and "[PRIORITY LEVEL]" may indicate an parameter for a priority level, e.g., "high," "medium," or "low," of the reminder."

If the phrase classifier 122 receives the phrase, "SET A REMINDER," the phrase classifier 122 may determine that, based on the trigger terms "SET A REMINDER" in the received phrase, the received phrase best matches the text pattern "SET A REMINDER AT [TIME] ON [DATE]" associated with the voice action for setting a reminder. If the phrase classifier 122 instead receives the phrase "SET A HIGH PRIORITY REMINDER" the phrase classifier 122 may determine that, based on the trigger terms "SET A" followed by "PRIORITY REMINDER" in the received phrase, the received phrase best matches the text pattern "SET A [PRIORITY LEVEL] PRIORITY REMINDER AT [TIME] ON [DATE]" associated with the voice action for setting a reminder. Lastly, if the phrase classifier 122 instead receives the phrase "REMIND ME AT 9 AM," the phrase classifier may determine that, based on the trigger terms "REMIND ME AT" in the received phrase, the received phrase best matches the text pattern "REMIND ME AT [TIME] ON [DATE]" associated with the voice action for setting a reminder.

From the tokenized terms and the determined particular voice action, the phrase classifier 122 may classify the received phrase based on determining the required parameters for the particular voice action to be performed, and determining whether there is a tokenized term for each of the required parameters. For example, for the phrase "SET A REMINDER," the phrase classifier 122 may determine, based on the trigger terms "SET A REMINDER" in the phrase, that the phrase best matches the text pattern "SET A REMINDER AT [TIME] ON [DATE]" that is associated with the voice action of setting a reminder, determine that voice action has a required parameter for time and a required parameter for date, determine that there are no terms in the phrase that correspond to a time or date, and based on determining that not all required parameters have corresponding terms in the phrase, classify the received phrase as in complete phrase.

If the phrase classifier 122 classifies that the received phrase is an incomplete phrase, the phrase classifier 122 may trigger the prompt manager 128 to prompt the user 160 to enter the required parameters. For example, the prompt manager 128 may generate a user interface 140 on a display of the device 110 that includes fields 142A and 142B for the user 160 to enter the required parameters. Additionally or alternatively, the prompt manager 128 may audibly prompt the user 160 to say the parameters by synthesizing speech that requests the user 160 speak the parameter. For example, the prompt manager 128 may trigger the device 110 to output synthesized speech of "WHAT DATE," receive a response from the user 160 of "Nov. 1, 2013" or "TOMORROW," output synthesized speech of "WHAT TIME," and receive a response from the user 160 of "9 AM."

The prompt manager 128 may determine when data indicating parameters for all the required parameters has been received from the user 160. When the prompt manager 128 determines that all the required parameters have been entered, the prompt manager 128 may trigger the suggested phrase provider 130 to provide a suggested complete phrase for performing the voice action using the entered parameters. For example, using the parameters of "Nov. 20, 2013" and "9:00 AM" entered by the user 160 after the user 160 speaks the incomplete phrase "SET A REMINDER," the suggested phrase provider 130 may output "YOU COULD HAVE SAID" along with a suggested complete phrase 144, "REMIND ME AT 9 AM TOMORROW."

In some implementations, the prompt manager 128 may trigger the suggested phrase provider 130 to suggest a partially complete phrase so that the user 160 may see how entered parameters change a suggested phrase. A partially complete phrase may be an incomplete phrase that includes one or more terms corresponding to a required or optional parameter. For example, if the user 160 says "SET A REMINDER" and then enters "9 AM," the suggested phrase provider 130 may suggest the partially complete phrase, "REMIND ME AT 9 AM." In another example, if the user 160 says "SET A REMINDER" and then enters a priority level of "HIGH," the suggested phrase provider 130 may suggest the partially complete phrase, "SET A HIGH PRIORITY REMINDER."

Additionally or alternatively, if a user 160 changes or removes a required parameter, the suggested phrase provider 130 may update a suggested phrase. For example, if the user 160 changes the field for time by changing "9 AM" to "11 AM," the suggested phrase provider 130 may suggest the incomplete phrase, "REMIND ME AT 11 AM." If the user 160 then clears the time field, the suggested phrase provider may suggest the incomplete phrase, "REMIND ME." Accordingly, the suggested phrase provider 130 may suggest phrases that correspond to the received phrase and entered parameters in real-time or near real-time, allowing users to learn a single phrase that the user can speak to perform the voice action.

In some implementations, the prompt manager 128 may trigger the suggested phrase provider 130 to suggest incomplete phrases, which may be partially complete phrases, when the suggested phrases are visually provided to the user 160. Accordingly, a suggested phrase in a visual interface may be updated with different incomplete phrases as parameters for the voice action are added, removed, or changed. In some implementations, the prompt manager 128 may not trigger the suggested phrase provider 130 to suggest an incomplete phrase when the suggested phrase is audibly provided to the user 160. Accordingly, a suggested phrase may only be audibly provided to the user 160 when the suggested phrase is a complete phrase.

The suggested phrase provider 130 may provide the suggested phrase based on the text patterns stored in the text pattern database 126. For example, after the user 160 says "SET A REMINDER" associated with a voice of setting a reminder, the suggested phrase provider 130 may apply text patterns associated with the voice action for setting a reminder and parameters of "9 AM" and "Nov. 20, 2013" to generate a complete phrase, "REMIND ME AT 9 AM TOMORROW."

The suggested phrase provider 130 and phrase classifier 122 may use the text patterns in "opposite" flows, e.g., the suggested phrase provider 130 may use the text patterns to map terms for the parameters to a suggested phrase and the phrase classifier 122 may use the same text patterns to tokenize the phrase for the parameters. For example, the text pattern "REMIND ME AT [TIME] [DATE]," that the phrase classifier 122 may use to tokenize a received phrase, may be used by the suggested phrase provider 130 to generate a suggested complete phrase by replacing "[TIME]" and "[DATE]" in the text pattern with the entered time parameter "9 AM" and entered date parameter "Nov. 20, 2013," respectively." The suggested phrase provider 130 may also recognize that "Nov. 20, 2013" is the next day and replace "[DATE]" with "TOMORROW" instead of "Nov. 20, 2013" as "TOMORROW" may take less time for the user to say and in the circumstances the user saying "TOMORROW" may have the same result as the user saying "Nov. 20, 2013."

The suggested phrase provider 130 may provide a suggested complete phrase using terms that are different than those used in the received phrase. For example, if the phrase "SET A REMINDER" and the phrase "REMIND ME" both correspond to a voice action of setting a reminder, the suggested phrase provider 130 may determine that the suggested complete phrase for a received phrase of "SET A REMINDER" followed by entered parameters of "10 PM" and "Nov. 3, 2013" should be "REMIND ME AT 10 PM ON Nov. 3, 2013" because "REMIND ME" is shorter than "SET A REMINDER."

In generating the complete phrase, the suggested phrase provider 130 may use terms for a voice action that are most similar to the terms used in the received phrase. For example, if the phrase "REMIND ME" and the phrase "SET A REMINDER" both correspond to a voice action of setting a reminder, the suggested phrase provider 130 may determine that the suggested complete phrase for a received phrase of "SET A REMINDER" followed by entered parameters of "10 PM" and "Nov. 3, 2013" should be "SET A REMINDER AT 10 PM ON Nov. 3, 2013" because the terms in the received phrase are more similar to "SET A REMINDER" in the text pattern that corresponds to the voice action than the terms "REMIND ME" that also correspond to the voice action.

If the phrase classifier 122 classifies that a phrase as a complete phrase, the device 110 may then perform the voice action. For example, for the phrase "SET A REMINDER AT 7 AM TOMORROW," the phrase classifier 122 may identify that the phrase matches the text pattern "SET A REMINDER AT [TIME][DATE]" associated with the voice action of setting a reminder based on the trigger terms "SET A REMINDER" in the phrase, determine that the parameters required for the voice action of setting a reminder are time and date, determine that there are tokenized terms, e.g., "7 AM" and "TOMORROW," in the received phrase that correspond to the parameters for time and date, and based on determining that there are tokenized terms in the received phrase that correspond to each of the required parameters for the voice action of setting a reminder, classify the received phrase "SET A REMINDER AT 7 AM TOMORROW" as a complete phrase. Based on the classification, the device 110 may set an alarm at 7 AM for tomorrow.

Different configurations of the system 100 may be used where functionality of the phrase classifier 122, voice action database 124, text pattern database 126, prompt manager 128, and suggested phrase provider 130 may be combined, further separated, distributed, or interchanged. The system 100 may be implemented in a single device or distributed across multiple devices. For example, the functionality of the device 110 may be distributed with a remote server that is in communication with the device 110.

Figure 2A:
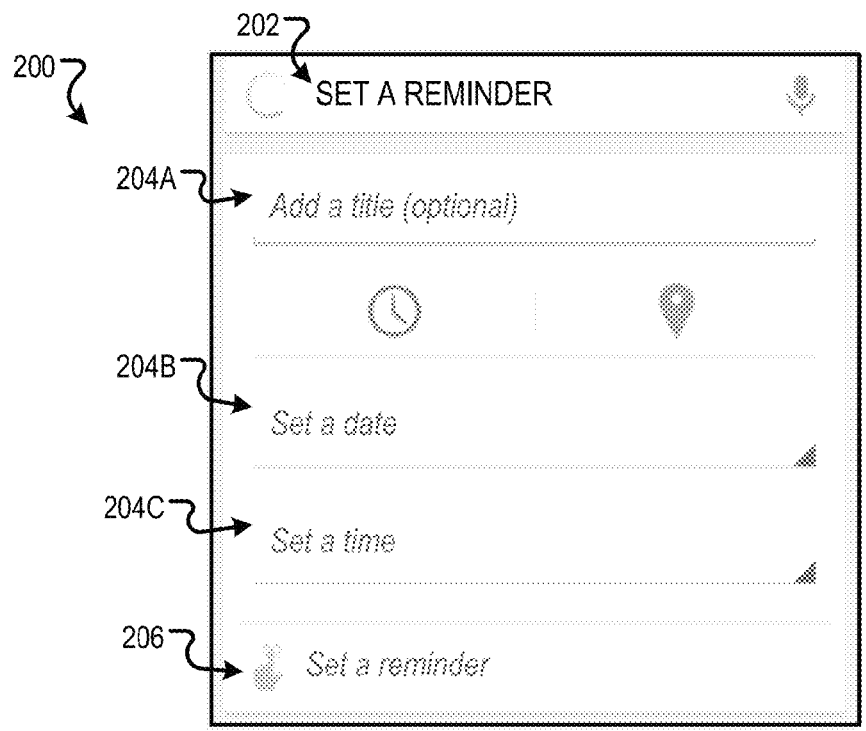
FIGS. 2A-2C are example user interfaces for suggesting a phrase for performing a voice action.
Figure 2B:
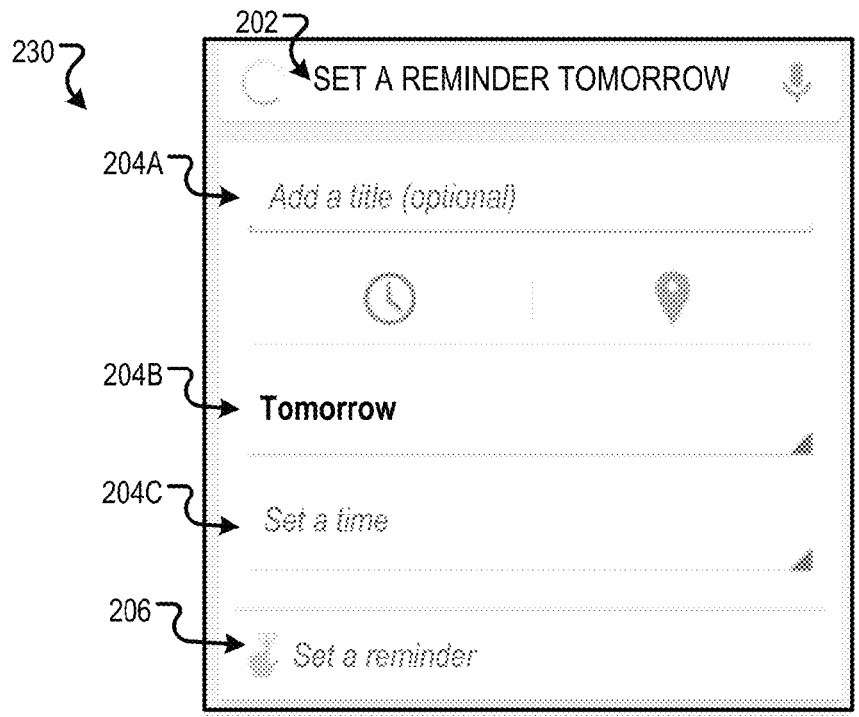
Figure 2C:
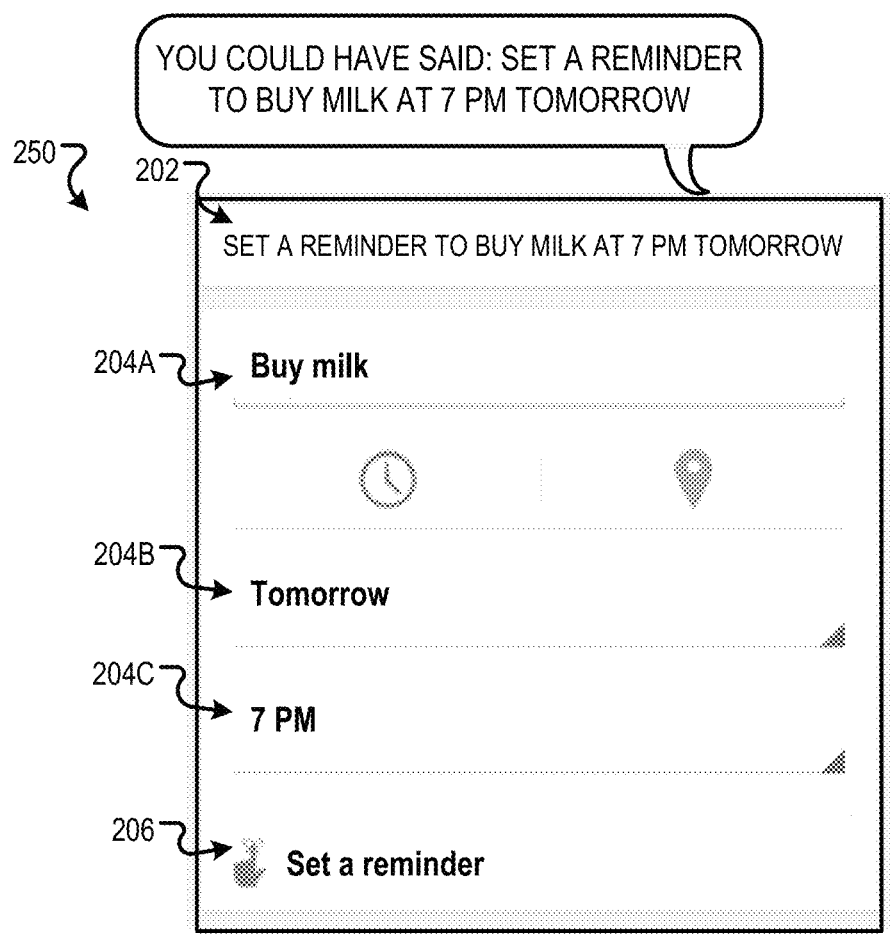

FIGS. 2A-2C are example user interfaces 200, 230, and 250 for suggesting a phrase for performing a voice action. The following describes the user interfaces 200, 230, and 250 in the context of components of the system 100 that are described with reference to FIG. 1. However, the user interfaces 200, 230, and 250 may be used by other systems or system configurations. The user interfaces 200, 230, 250 may be examples of the user interface 140 on the display of the device 110 that the user 160 may use to enter required parameters.

FIG. 2A is a user interface 200 that may be displayed after a user says "SET A REMINDER." The user interface 200 includes a suggested phrase field 202, a title field 204A, a date field 204B, a time field 204C, and a control for triggering performance of the voice action. In response to receiving the phrase "SET A REMINDER," the prompt manager 128 may generate the user interface 200 based on determining that the phrase "SET A REMINDER" corresponds to a voice action for setting a reminder, determining that the voice action for setting a reminder includes required parameters of date and time and an optional parameter of title that may indicate a description of the reminder, including fields for the determined parameters, and adding the terms "SET A REMINDER" that correspond to the voice action in the suggested phrase field 202. As shown, the title, date, and time fields 204A-C are shown with default text in italics and shading that prompts the user to enter the parameters. The title field 204A includes the default text "ADD A TITLE (OPTIONAL)," the date field 204B includes the default text "SET A DATE," and the time field 204C includes the default text "SET A TIME."

FIG. 2B is a user interface 230 that may be displayed after the user enters the parameter "TOMORROW" into the date field 204B. Based on the entered parameter, the suggested phrase provider 130 may generate a suggested phrase of "SET A REMINDER TOMORROW." As shown, the suggested phrase may be shown in the suggested phrase field 202.

FIG. 2C is a user interface 250 that may be displayed after the user enters "BUY MILK" for the optional title parameter and "7 PM" for the required time parameter. Based on the entered parameters, the suggested phrase provider 130 may generate a suggested phrase of "SET A REMINDER TO BUY MILK AT 7 PM TOMORROW," and as shown, display the suggested phrase. The suggested phrase may also be audibly provided the user 160. For example, the suggested phrase provider 130 may also synthesize speech of "YOU COULD HAVE SAID: SET A REMINDER TO BUY MILK AT 7 PM TOMORROW." The suggested phrase provider 130 may synthesize the speech when the suggested phrase provider 130 determines that all the required parameters are provided or alternatively, every time a parameter is entered or modified.

In some implementations, the suggested phrase provider may only provide the suggested phrase when the user confirms that the voice action should be performed. For example, the suggested phrase provider 130 may not generate a suggested phrase based on the entered parameters until the suggested phrase provider 130 detects that the user 160 has selected control 206 to trigger performance of the voice action.

Figure 3:
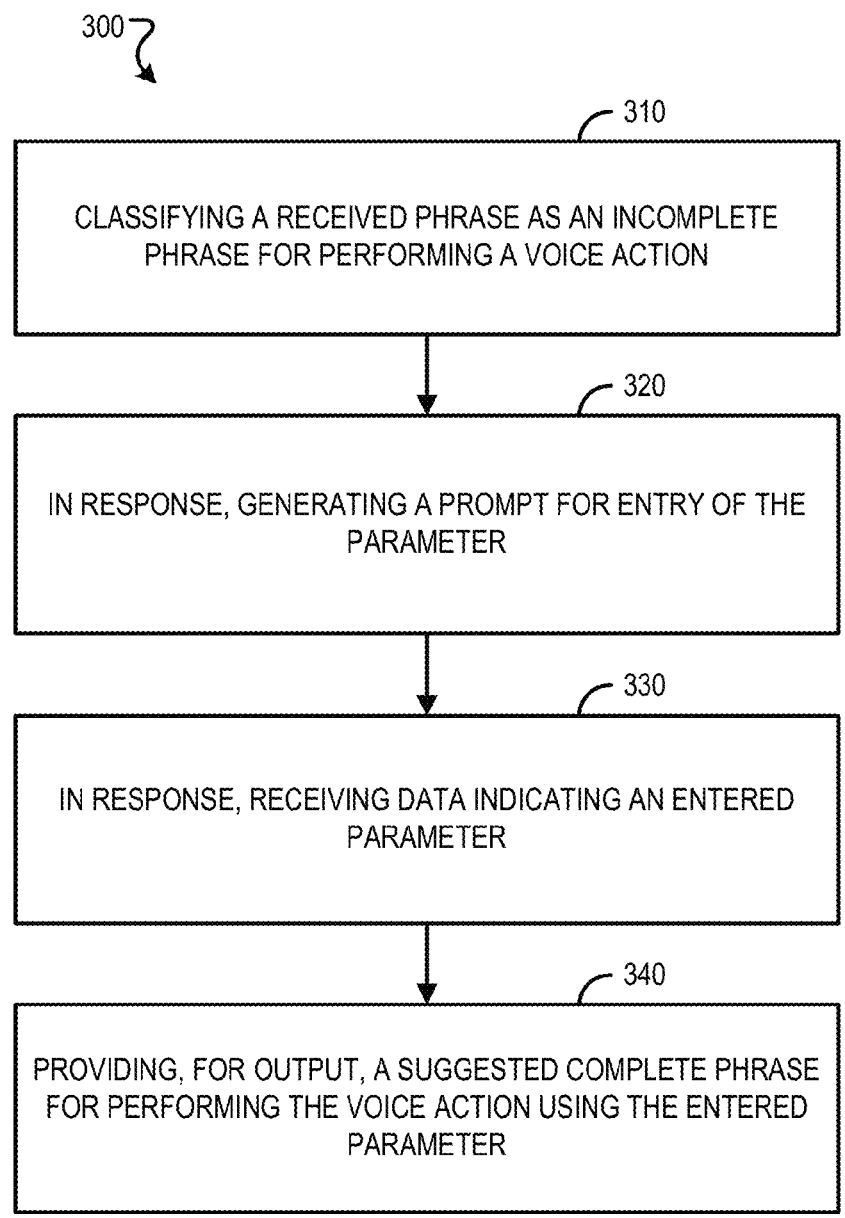
FIG. 3 is a flowchart of an example process for suggesting a phrase for performing a voice action.

FIG. 3 is a flowchart of an example process 300 for suggesting a phrase for performing a voice action. The following describes the processing 300 as being performed by components of the system 100 that are described with reference to FIG. 1. However, the process 300 may be performed by other systems or system configurations.

The process 300 may include classifying a received phrase as an incomplete phrase for performing a voice action (310). For example, the phrase classifier 122 may receive the phrase "SEND A TEXT MESSAGE TO MOM," determine that the received phrase corresponds to a voice action of sending a text message based on parsing the received phrase using a text pattern "SEND A TEXT MESSAGE TO [RECIPIENT] WITH THE TEXT CONTENT [TEXT CONTENT]," wherein "[RECIPIENT]" identifies a recipient and "[TEXT CONTENT]" indicates text content, determine that the voice action includes a required recipient parameter that identifies a recipient for the text message and a required text content parameter that indicates the text content for the text message, determine that the received phrase includes a term for the recipient parameter but does not include a term for the text content, and in response to determining that the received phrase does not include a term for the text content, classify the received phrase as an incomplete phrase.

The process may include, in response to classifying that the received phrase is an incomplete phrase, generating a prompt for entry of the parameter (320). For example, for the received phrase "SEND A TEXT MESSAGE TO MOM," the prompt manager 128 may generate an interface with fields for the user 160 to enter the text content parameter. Additionally or alternatively, the prompt manager 128 may synthesize speech "WHAT IS THE TEXT CONTENT" to request the user say the text content parameter.

The process may include receiving data indicating an entered parameter (330). For example, the prompt manager 128 may receive data of "BE HOME IN 10 MINUTES" for the text content parameter. The prompt manager 128 may receive the data by the user entering text of "BE HOME IN 10 MINUTES" into a field for the text content parameter shown in the user interface or the user speaking "BE HOME IN 10 MINUTES" in response to an audible prompt for the text content parameter.

The process may include providing, for output, a suggested complete phrase for performing the voice action using the entered parameter (340). For example, in response to receiving data for the text content parameter of "BE HOME IN 10 MINUTES," the prompt manager 128 may determine that the required text content parameter and recipient parameter for the voice action of sending a text message have been entered or have a term in the received phrase that corresponds to the required parameter.

In response to the determination, the prompt manager 128 may trigger the suggested phrase provider 130 to generate a suggested complete phrase "TEXT MOM, BE HOME IN 10 MINUTES." The prompt manager 128 may generate the suggested complete phrase based on identifying that the term "TEXT" is the shortest term for indicating the voice action of sending a text message and applying the text pattern, "TEXT [RECIPIENT][TEXT CONTENT]" where "[RECIPIENT]" indicates a recipient and "[TEXT CONTENT]" indicates text content, to form a complete phrase with the identified term "TEXT" that indicates the voice action, the term "MOM" for the required recipient parameter that was included in the received phrase, and the terms "BE HOME IN 10 MINUTES for the entered text content parameter.

As mentioned above, in some implementations, the suggested phrase provider 130 may generate a suggested complete phrase that most closely matches the received phrase. For example, instead of suggesting "TEXT MOM, BE HOME IN 10 MINUTES" in response to the received phrase "SEND A TEXT MESSAGE TO MOM" and the entering of "BE HOME IN 10 MINUTES," the suggested phrase provider 130 may identify that the terms "SEND A TEXT MESSAGE," corresponding to the voice action of sending a text message, are the closest terms to those in the received phrase and apply a corresponding grammar "SEND A TEXT MESSAGE TO [RECIPIENT] WITH THE TEXT CONTENT OF [TEXT CONTENT]" for the terms to suggest "SEND A TEXT MESSAGE TO MOM WITH THE TEXT CONTENT OF BE HOME IN 10 MINUTES."

Additionally, as mentioned above, the suggested phrase provider 130 may also provide partially complete phrases. For example, if the received phrase were instead "SEND A TEXT MESSAGE," the suggested phrase provider 130 may first provide as the suggested phrase, "SEND A TEXT MESSAGE." If the user then entered "MOM" for the recipient parameter, the suggested phrase provider 130 may then provide as the suggested phrase, "SEND A TEXT MESSAGE TO MOM." If the user then changed the recipient parameter to "DAD," the suggested phrase provider 130 may also then provide as the suggested phrase, "SEND A TEXT MESSAGE TO DAD."

Figure 4:
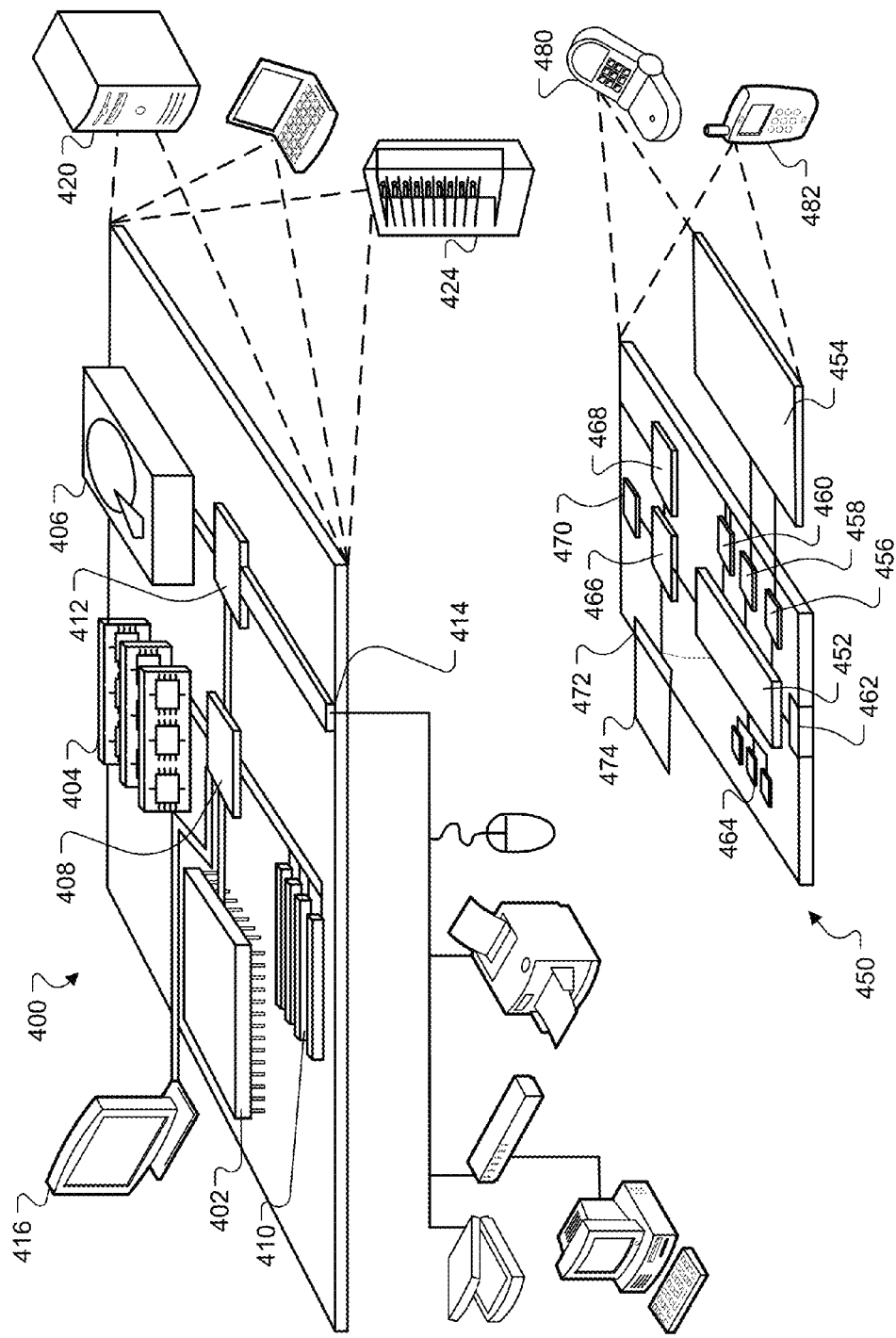
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
classifying a received phrase as an incomplete phrase for performing a voice action based at least on determining that (i) the voice action requires a parameter, and (ii) that no term of the phrase corresponds to the parameter;
in response to classifying the phrase as an incomplete phrase, generating a prompt for entry of the parameter;
in response to the prompt, receiving data indicating an entered parameter; and
providing, for output, a suggested complete phrase for performing the voice action using the entered parameter, the suggested complete phrase comprising a phrase that when subsequently received causes the voice action to be performed without prompting for the entry of the parameter after determining that the suggested complete phrase includes one or more terms that correspond to the voice action.

2. The method of claim 1, further comprising receiving the phrase, wherein the phrase includes one or more terms that correspond to the voice action.

3. The method of claim 1, wherein generating a prompt for entry of the parameter comprises at least one of:
generating a user interface for display that includes fields for entry of the parameter; and
synthesizing speech that requests the user speak the parameter.

4. The method of claim 1, further comprising:
receiving data indicating another parameter that is required for the voice action; and
determining that data indicating all parameters that are required for the voice action have been received,
wherein providing, for output, the suggested complete phrase for performing the voice action comprises synthesizing speech of the suggested complete phrase in response to determining that data indicating all the parameters that are required for the voice action have been received.

5. The method of claim 1, further comprising:
before receiving data indicating the entered parameter, receiving data indicating another parameter that is required for the voice action; and before providing, for output, the suggested complete phrase for performing the voice action using the entered parameter, providing, for display in a user interface, a suggested partially complete phrase for performing the voice action using the other parameter.

6. The method of claim 1, further comprising:
receiving data indicating another parameter that is not required for the voice action, wherein providing, for output, the suggested complete phrase for performing the voice action using the entered parameter comprises providing, for output, a suggested complete phrase for performing the voice action using the received parameter and the received other parameter.

7. The method of claim 1, wherein providing, for output, a suggested complete phrase for performing the voice action using the entered parameter comprises:
selecting a text pattern based at least on the one or more terms that correspond to the voice action; and
generating the suggested complete phrase based at least on applying the selected text pattern to the entered parameter.

8. The method of claim 1, wherein the suggested complete phrase does not include any term that appears in the received phrase.

9. A system comprising:
one or more computers; and
one or more storage devices storing instructions that are operable, when executed by the one or more computers, to cause the one or more computers to perform operations comprising: classifying a received phrase as an incomplete phrase for performing a voice action based at least on determining that (i) the voice action requires a parameter, and (ii) that no term of the phrase corresponds to the parameter;
in response to classifying the phrase as an incomplete phrase, generating a prompt for entry of the parameter;
in response to the prompt, receiving data indicating an entered parameter; and
providing, for output, a suggested complete phrase for performing the voice action using the entered parameter, the suggested complete phrase comprising a phrase that when subsequently received causes the voice action to be performed without prompting for the entry of the parameter after determining that the suggested complete phrase includes one or more terms that correspond to the voice action.

10. The system of claim 9, wherein the operations further comprise receiving the phrase, wherein the phrase includes one or more terms that correspond to the voice action.

11. The system of claim 9, wherein generating a prompt for entry of the parameter comprises at least one of:
generating a user interface for display that includes fields for entry of the parameter; and
synthesizing speech that requests the user speak the parameter.

12. The system of claim 9, wherein the operations further comprise:
receiving data indicating another parameter that is required for the voice action; and
determining that data indicating all parameters that are required for the voice action have been received,
wherein providing, for output, the suggested complete phrase for performing the voice action comprises synthesizing speech of the suggested complete phrase in response to determining that data indicating all the parameters that are required for the voice action have been received.

13. The system of claim 9, wherein the operations further comprise:
before receiving data indicating the entered parameter, receiving data indicating another parameter that is required for the voice action; and
before providing, for output, the suggested complete phrase for performing the voice action using the entered parameter, providing, for display in a user interface, a suggested partially complete phrase for performing the voice action using the other parameter.

14. The system of claim 9, wherein the operations further comprise:
receiving data indicating another parameter that is not required for the voice action,
wherein providing, for output, the suggested complete phrase for performing the voice action using the entered parameter comprises providing, for output, a suggested complete phrase for performing the voice action using the received parameter and the received other parameter.

15. A non-transitory computer-readable medium storing instructions executable by one or more computers which, upon such execution, cause the one or more computers to perform operations comprising:
classifying a received phrase as an incomplete phrase for performing a voice action based at least on determining that (i) the voice action requires a parameter, and (ii) that no term of the phrase corresponds to the parameter;
in response to classifying the phrase as an incomplete phrase, generating a prompt for entry of the parameter;
in response to the prompt, receiving data indicating an entered parameter; and
providing, for output, a suggested complete phrase for performing the voice action using the entered parameter, the suggested complete phrase comprising a phrase that when subsequently received causes the voice action to be performed without prompting for the entry of the parameter after determining that the suggested complete phrase includes one or more terms that correspond to the voice action.

16. The computer-readable medium of claim 15, wherein the operations further comprise receiving the phrase, wherein the phrase includes one or more terms that correspond to the voice action.

17. The computer-readable medium of claim 15, wherein generating a prompt for entry of the parameter comprises at least one of:
generating a user interface for display that includes fields for entry of the parameter; and
synthesizing speech that requests the user speak the parameter.

18. The computer-readable medium of claim 15, wherein the operations further comprise:
receiving data indicating another parameter that is required for the voice action; and
determining that data indicating all parameters that are required for the voice action have been received,
wherein providing, for output, the suggested complete phrase for performing the voice action comprises synthesizing speech of the suggested complete phrase in response to determining that data indicating all the parameters that are required for the voice action have been received.

19. The computer-readable medium of claim 15, wherein the operations further comprise:
before receiving data indicating the entered parameter, receiving data indicating another parameter that is required for the voice action; and before providing, for output, the suggested complete phrase for performing the voice action using the entered parameter, providing, for display in a user interface, a suggested partially complete phrase for performing the voice action using the other parameter.

* * * * *